Patented May 8, 1923.

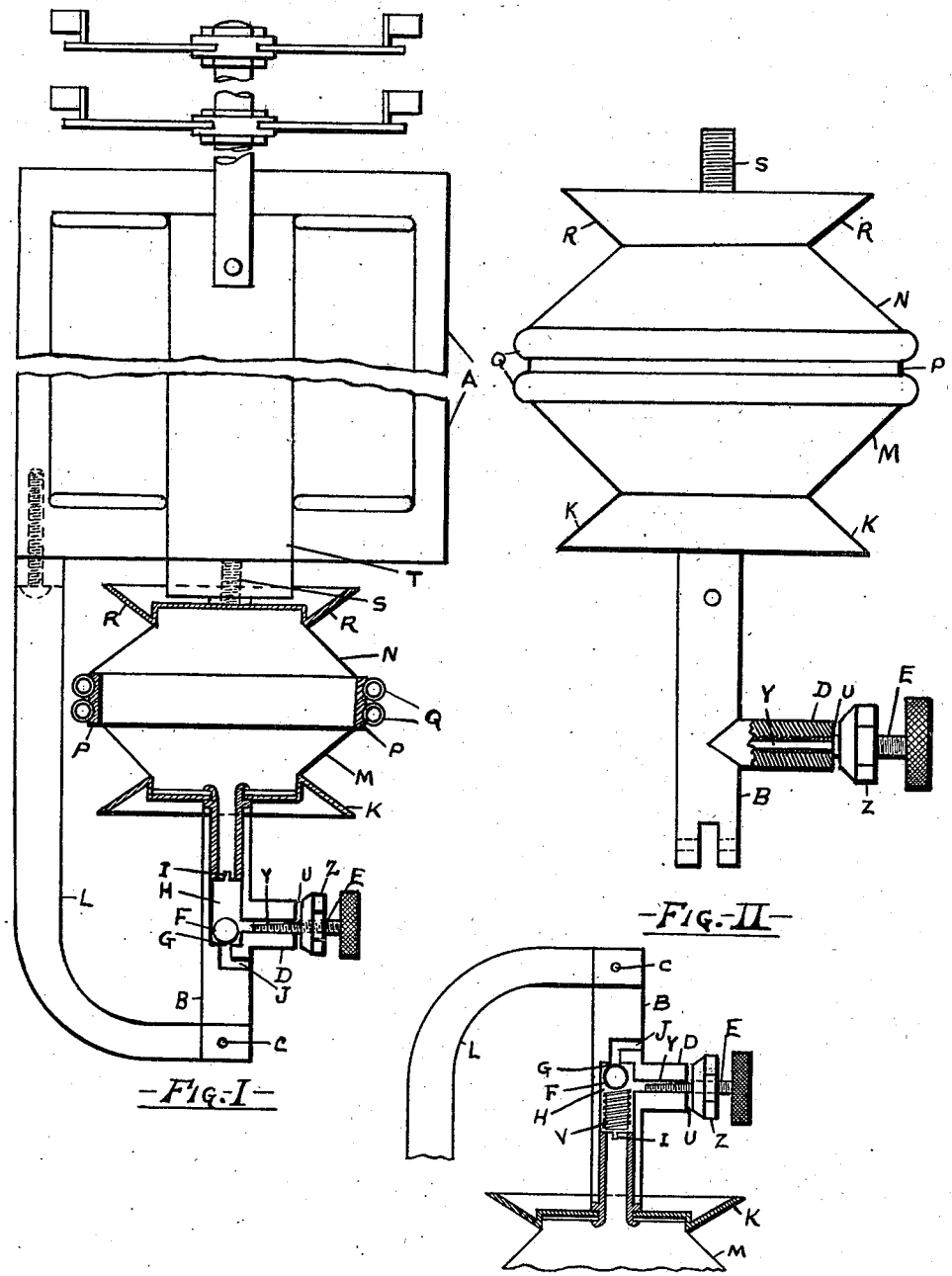

1,454,129

UNITED STATES PATENT OFFICE.

OLIVER J. MARSHICK, OF DETROIT, MICHIGAN.

BELLOWS MECHANISM FOR ELECTRIC RELAYS.

Application filed May 3, 1918. Serial No. 232,407.

*To all whom it may concern:*

Be it known that I, OLIVER J. MARSHICK, a citizen of the United States, residing at Detroit, county of Wayne, State of Michigan, have invented a certain new and useful Improvement in Bellows Mechanism for Electric Relays, and declare the following to be a full, clear, and exact description of the same, such as will enable others skilled in the art to which it pertains to make and use the same, reference being had to the accompanying drawings, which form a part of this specification.

This invention relates to a bellows and valve mechanism particularly adapted for use in place of the well-known dash-pot mechanism for an electric relay; it has for its object the greater promptness and certainty of operation of the relay parts formerly dependent on the action of a dash-pot.

In the drawings:

Figure 1 is an elevational view, partly in section, of my improved apparatus, together with enough of the connected and cooperating parts of the relay to illustrate its use.

Figure 2 is an enlarged elevational view of the bellows and its connected valved pipe.

Figure 3 is a partly sectional view of the device in inverted position, wherein a spring is employed to yieldingly hold the ball valve on its seat.

A indicates the relay frame, from whose bottom portion depends the L-shaped bracket L, to whose tip the solid lower end of the stem B is connected and united by a screw or pin C. From about the center of the stem B projects a lateral branch D, in which engages the thumb screw E. This screw stops short of reaching the hollow center H of the stem B, and extending lengthwise thereof for a part of its length is the tapered slot Y. When the screw is projected to its limit into the branch D, the only chance for the passage of air therethrough is around the threading; but when the screw is partly retracted from the branch D, the outer end of the slot Y connects with the air space U between the end of the branch D and the adjacent face of the inverted castellated nut Z.

The ball F normally rests on the seat G at the lower end of the hollow portion H of the stem, and this is connected with the outer air by the L-shaped passage J. From the upper end of the hollow portion H leads a pipe O, which leads through the inverted-saucer-shaped member K which serves as the base of one of the bellows members, whose lower and upper truncated cone portions M and N are united into one chamber, by the rigid ring P and hoops Q. The lower end of the pipe O may be notched or cut away in places, as at I, so that even when the ball F seats thereagainst, the closure will not be complete. At the top of the upper section N of the bellows is a dished plate R, similar to the member K already described, from which rises the threaded stem S, by which the bellows as a whole is connected with the piston or plunger T of the relay.

When the bellows is expanded by the rise of the relay plunger T, the ball valve F is strongly drawn from its seat, allowing air to rush through the passage J into the interior of the bellows. When, however, the inrush of air ends, the ball valve F falls back onto its seat G, so when the weight of the relay plunger falls on the bellows, the deflation thereof proceeds slowly or rapidly, as may be desired, through the tapered slot Y and air space U. This results in the introduction of the desired time element in breaking the contacts of the relay and yet the response of the device to the pull of the relay plunger is fully as prompt as is that of a dash pot.

This device may also be used in reversed position from that shown in Figure 1, being shown fragmentarily in such position in Figure 3. In this position a spring V is employed to yieldingly press the ball valve F on its seat; the response of the bellows to the falling movement of the plunger is then the quick one, being the one then resulting in the inflation of the bellows, whereas the dropping of the plunger causes the slow deflation of the bellows for the same reason as before, namely the small air passage past the screw, or through the tapered slots Y therein.

What I claim is:

1. A retarding device for an electric relay, having in combination a fluid-tight bellows member adapted to be drawn to expanded position by the pull substantially lengthwise thereof of a connected external member, the relatively flexible walls of said bellows being adapted to compensate for possible variations in alignment of the parts by negligible differences in their degree of expansion on one side as contrasted with the other, a pipe connected with the opposite end of the bellows member from that externally connected with the expanding means, a normally closed valve in said pipe adapted to be unseated by the inrush of air when the bellows member is distended, and regulatable means connected with said pipe for permitting the escape of air from said bellows during its deflation.

2. In combination with a plunger member, a bellows member connected at one end therewith and adapted to be drawn to expanded position by the movement thereof, said bellows member automatically lending itself to the offsetting of frictional retardation to the action of the metal parts due to slight departures from entire alignment, a valve adapted to permit the inrush of air into said bellows when the same is expanded and to be closed when the deflation movement thereof begins, and a valve-controlled pipe, connected with the opposite side of the bellows from the plunger member for permitting the deflation of said bellows to proceed slowly in spite of the closed position of said valve.

3. The combination, with a bellows member capable of a diverse degree of expansion on one side as contrasted with the other, of an actuating plunger connected with one end thereof, a plurally opening pipe connected with the other end of said bellows member, a normally seated valve controlling one of the openings of said pipe, adapted to be unseated by the inrush of air resulting from the expansion of said bellows member and to resume its position of closure when the expanding movement of the bellows is succeeded by its deflation movement, and means controlling the possible flow of air through the other opening in the pipe, whereby the deflating flow of air may thereafter regulatably continue.

4. The combination, with an expansible bellows member, adapted to lend itself to variations from exact alignment of its connecting parts, of a plurally branched inlet and outlet pipe connected with one end thereof, a valve member appurtenant to one of the branches of said pipe, adapted to be unseated by the inrush of air due to the expansion of said bellows and to be seated when the deflation of the bellows begins, a valve controlling the other branch of said pipe, whereby the outflow of air due to the deflation of the bellows may be regulatably permitted, and an actuating plunger connected with the opposite end of the bellows from that with which said pipe is connected.

5. A time-limiting device for an electric relay, having in combination a longitudinally expansible bellows member, the degree of whose expansion on one side as contrasted with the other automatically lends itself to compensating for slight variations from true alignment of its connected actuating parts; means for effecting its distension to an unusual degree proportionately to the axially longitudinal movement involved and for thereafter applying pressure thereto to effect its deflation, a pipe leading from the other side of said bellows from that with which said distending and deflating means is connected, a valve in said pipe adapted to permit the rapid inrush of air when the bellows is distended, and adjustable means appurtenant to said pipe for regulating the speed of escape thereof proportionately to the weight applied to the other side of the bellows.

In testimony whereof I sign this specification in the presence of two witnesses.

OLIVER J. MARSHICK.

Witnesses:
 HARRY L. WAGNER,
 WILLIAM M. SWAN.